Dec. 23, 1952 W. G. LUNDQUIST 2,622,789
TURBINE EXPANSION SECTION CONSTRUCTION
Filed June 8, 1948
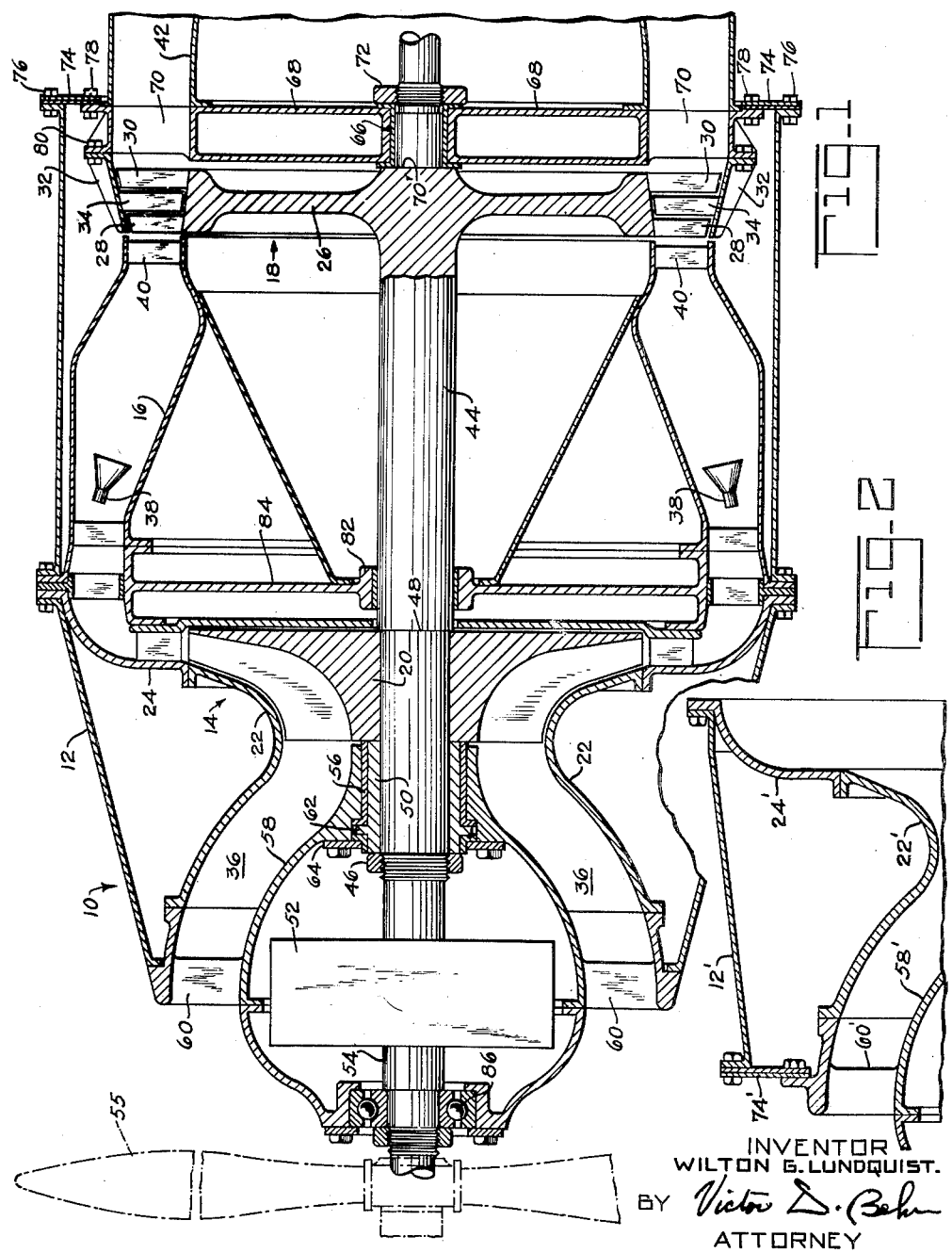
INVENTOR
WILTON G. LUNDQUIST.
BY
ATTORNEY Patented Dec. 23, 1952

2,622,789

UNITED STATES PATENT OFFICE 2,622,789

TURBINE EXPANSION SECTION CONSTRUCTION

Wilton G. Lundquist, Hohokus, N. J., assignor to Curtiss-Wright Corporation, a corporation of Delaware Application June 8, 1948, Serial No. 31,651

7 Claims. (Cl. 230—116)

This invention relates to gas turbine power plants and is particularly directed to a construction permitting relative axial expansion between the supporting housing structure of such a power plant and at the same time providing accurate axial location of the two ends of said rotor structure relative to their respective cooperating stator structures, said stator structures are also being supported by said housing.

Essentially, a gas turbine power plant comprises a compressor, a combustion chamber and a turbine, said compressor being driven by said turbine for supplying compressed air to said combustion chamber from which the combustion gases are directed against the turbine rotor blades for driving said turbine. In such a power plant, the turbine rotor must be accurately located axially relative to its cooperating stator structure and the compressor rotor must be accurately located axially relative to its cooperating stator structure, said stators and rotors all being supported from the housing of said power plant. During operation of the power plant, the shaft connecting the compressor and turbine rotors generally runs hotter than the power plant housing so that said shaft expands relative to said housing. Accordingly, it is an object of this invention to provide a construction permitting relative expansion of said housing and said rotor shaft without disturbing the accurate location of the compressor and turbine rotors relative to their respective stators.

Specifically the invention comprises a laminated annular plate-like structure connected to the turbine rotor end of the power plant housing and supporting the turbine rotor and its stator structure. This laminated plate-like structure is radially and tangentially rigid but is axially flexible to an extent sufficient to permit relative expansion of the power plant housing and its rotor structure without affecting the relative axial positions of the turbine and compressor rotors relative to their respective stators.

Other objects of the invention will become apparent upon reading the annexed detailed description of the drawing in which:

Figure 1 comprises the schematic axial sectional view of a gas turbine power plant embodying the invention; and Figure 2 is a partial view illustrating a modification of the invention.

Referring first to Figure 1 of the drawing, a gas turbine power plant 10 comprises a rigid housing 12, a compressor assembly 14, a combustion chamber 16, and a turbine assembly 18. The compressor assembly 14 comprises a compressor rotor or impeller 20, a fixed shroud 22 and a diffuser 24. The turbine assembly 18 comprises a turbine rotor 26 having first and second stage rotor blades 28 and 30 projecting therefrom and a stator structure 32 carrying stator blades 34 between the rotor blades 28 and 30.

The compressor assembly 14 takes in air through an annular intake passage 36 and compresses said air into the combustion chamber 16. Fuel is introduced into the combustion chamber 16 through nozzles 38 for combustion therein. The products of combustion are directed by a suitable guide vane or nozzle structure 40 and by the stator blades 34 against the first stage and second stage rotor blades 28 and 30 respectively for driving the turbine rotor. From the turbine rotor, the combustion gases discharge rearwardly through the exhaust duct 42.

A shaft 44 drivably connects the turbine rotor 26 to the compressor rotor or impeller 20 said shaft being rigidly connected to said rotor and impeller. As illustrated, the shaft 44 may be integral with the turbine rotor 26 while the compressor rotor 20 is clamped by a nut 46 between a shoulder 48 on the shaft 44 and a sleeve 50. In addition, axial driving splines may be provided between the shaft 44 and the compressor rotor 20. With this construction, the compressor rotor 20 is rigid with one end of the shaft 44 while the turbine rotor is rigid with the other end of said shaft. In the case of an aircraft gas turbine power plant, the shaft 44 may also be connected through a speed reduction gear unit 52 with a shaft 54 for driving a conventional bladed propeller 55. This type of power plant is conventional and is known as a turbo-prop engine.

The compressor impeller 20 and the adjacent portion of the shaft 44 is journaled in a bushing 56 carried by the inner wall 58 of the intake duct 36, said wall being secured to the forward end of the power plant housing 12 by means of webs or struts 60 extending across said duct. In addition, the shaft sleeve 50 is provided with a flange 62 extending into an annular groove formed by a plate 64 secured to the inner wall 58 of the duct 36 to form a thrust bearing axially locating the impeller 20 relative to the forward end of the housing 12. As illustrated, the impeller shroud 22 is also secured to the forward end of the housing 12. With this construction, the impeller 20 and its shroud 22 are axially fixed relative to the forward end of the rigid supporting housing 12.

The turbine rotor 26 is journaled in a bushing 66 carried by a rigid supporting diaphragm or bulkhead 68, said diaphragm or bulkhead including a plurality of webs or struts 70 extending across the exhaust duct 42. The hub of the diaphragm 68 is disposed between a shoulder 70' and a nut 72 on the turbine rotor whereby said diaphragm and turbine rotor are axially fixed relative to each other. The diaphragm 68 is secured to the rigid supporting housing 12 by means of an annular laminated structure 74 comprising a plurality of annular plates stacked together. The outer edge of the laminated structure 74 is secured to the housing 12 by bolts 76 and its inner edge is secured to the diaphragm 68 by bolts 78. The turbine stator structure is also secured to the diaphragm 68 by bolts 80 thereby fixing the axial position of the turbine rotor 26 relative to its stator 32.

The annular laminated plate-like structure 74 is radially and tangentially rigid thereby supporting the turbine rotor 26 and its stator 32 from the housing 12. However, the laminated structure 74 is axially flexible to an extent sufficient to permit relative axial movement between the adjacent or rear end of the housing 12 and the turbine rotor 26 and its stator structure 32. With this construction, the turbine shaft 44 can expand relative to the housing 12 without changing the axial position of the turbine rotor 26 relative to its stator 32, the difference in said expansions being taken up by axial flexing of the annular laminated structure 74.

At the same time the axial position of the compressor impeller 20 relative to its stator is also fixed, as previously described.

Accordingly, the annular laminated structure 74 permits relative expansion of the rigid supporting housing structure 12 of the power plant and its rigid rotor structure without changing the relative axial position of the compressor impeller and its stator at the forward end of the power plant and without changing the relative axial position of the turbine rotor and its stator at the rear end of the power plant.

The shaft 44 may also be provided with a bearing 82 between the bearings 56 and 66. The bearing 82 is supported by the housing 12 through a diaphragm 84, said bearing offering no axial restraint to the shaft 44.

The thrust of the propeller 55 must be transmitted through suitable thrust bearing structure, as for example the bearing 86, to the power plant housing 12 and thence to the power plant mounting structure. The drawing illustrates a turbo-prop engine having a tractor-type propeller. Accordingly, in order to avoid transmission of the propeller thrust or pull through the axially flexible structure 74, said structure is preferably connected between the turbine stator structure and the adjacent portion of the power plant housing 12.

It may be desirable, in certain installations, to connect the axially flexible laminated structure between the compressor stator structure and the adjacent end of the power plant housing as illustrated in Figure 2, instead of, as in Figure 1, between the turbine stator structure and the adjacent end of the power plant housing. Thus, in a turbo-prop engine having a pusher propeller disposed at the gas turbine end of the power plant, and in the case of a turbo-jet engine, the main power plant thrust is applied as a push to the rear or gas turbine end of the power plant. In such installations, in order to avoid transmission of the main power plant thrust through the axially flexible laminated structure, said structure is preferably connected to the forward or compressor end of the power plant. Figure 2 comprises a partial view of such a modification and the parts of Figure 2 corresponding to those of Figure 1 have been indicated by similar but primed reference numerals.

In Figure 2, the compressor stator structure 58' and its struts 60' are connected to the radially inner edge of the axially flexible laminated structure 74' while the radially outer edge of said structure is connected to the forward end of the rigid power plant housing 12'. The main power plant thrust is transmitted to the rear or turbine end of said housing 12', so that said rear end is connected rigidly to the turbine stator structure instead of, as in Figure 1, through an axially flexible laminated structure.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A gas turbine power plant comprising a turbine rotor having a plurality of blades extending therefrom; a turbine stator having a plurality of blades disposed in close axially spaced relation relative to said rotor blades; a housing for said rotor and stator; and structure supporting said stator and rotor from said housing and axially locating said rotor relative to said stator, said structure including axially flexible means comprising a plurality of annular co-axial plates stacked together and connected along their radially outer edges to said housing and along their radially inner edges to said turbine rotor and stator for providing for axial movement of said stator and rotor as a unit relative to said housing.

2. A gas turbine power plant comprising a compressor assembly including a bladed rotor, a stator and means interconnecting said rotor and stator to maintain a small axial clearance between the blades of said rotor and the adjacent portion of said stator; a turbine assembly including a bladed rotor, a stator and means interconnecting said turbine rotor and stator to maintain a small axial clearance between the blades of said turbine rotor and the adjacent portion of the turbine stator; shaft means drivably connecting the rotors of said turbine and compressor assemblies; a housing within which said turbine and compressor assemblies and said shaft means are disposed; means supporting said compressor assembly from said housing; and means supporting said turbine assembly from said housing; one of said supporting means including flexible means connecting the turbine and compressor stator together through said housing and through said flexible means to provide for relative axial movement between said stators, whereby said shaft means and rotors can expand relative to said housing without changing the axial positions of said rotors relative to their respective stators.

3. A gas turbine power plant comprising a compressor assembly including a bladed rotor, a stator and means interconnecting said rotor and stator to maintain a small axial clearance between the blades of said rotor and the adjacent portion of said stator; a turbine assembly including a bladed rotor, a stator and means interconnecting said turbine rotor and stator to maintain a small axial clearance between the blades of said turbine rotor and the adjacent portion of the turbine stator; shaft means drivably connecting the rotors of said turbine and compressor assemblies; a housing within which said turbine and compressor assemblies and said shaft means are disposed; means supporting said compressor assembly from said housing; and means supporting said turbine assembly from said housing; one of said supporting means including means radially and torsionally rigid but axially flexible connecting the turbine and compressor stators together through said housing and through said axially flexible means to provide for relative axial movement between said stators, whereby said shaft means and rotors can expand relative to said housing without changing the axial positions of said rotors relative to their respective stators.

4. A gas turbine power plant comprising a compressor assembly including a bladed rotor, a stator and means interconnecting said rotor and stator to maintain a small axial clearance between the blades of said rotor and the adjacent portion of said stator; a turbine assembly including a bladed rotor, a stator and means interconnecting said turbine rotor and stator to maintain a small axial clearance between the blades of said turbine rotor and the adjacent portion of the turbine stator; shaft means drivably connecting the rotors of said turbine and compressor assemblies; a housing within which said turbine and compressor assemblies and said shaft means are disposed; means supporting said compressor assembly from said housing; and means supporting said turbine assembly from said housing; one of said supporting means being axially flexible and including a plurality of annular plates stacked together and connected along one of their edges to said housing and along their other edges to the associated assembly to connect the turbine and compressor stators together through said housing and said plates, said plates being capable of flexing to provide for relative axial movement between said stators whereby said shaft means and rotors can expand relative to said housing without changing the axial positions of said rotors relative to their respective stators.

5. A gas turbine power plant comprising a compressor assembly including a bladed rotor, a stator and means interconnecting said rotor and stator to maintain a small axial clearance between said blades of said rotor and the adjacent portion of said stator; a turbine assembly including a bladed rotor, a stator and means interconnecting said turbine rotor and stator to maintain a small axial clearance between the blades of said turbine rotor and the adjacent position of the turbine stator; shaft means drivably connecting the rotors of said turbine and compressor assemblies; an axially rigid housing within which said turbine and compressor assemblies and said shaft means are disposed; means supporting said compressor assembly from said housing; and means supporting said turbine assembly from said housing, said turbine assembly supporting means including means radially and torsionally rigid but axially flexible connecting the turbine and compressor stators together through said housing and through said axially flexible means so as to provide for relative axial movement between said stators, whereby said shaft means and rotors can expand relative to said housing without changing the axial positions of said rotors, relative to their respective stators.

6. A gas turbine power plant comprising a compressor assembly including a bladed rotor, a stator and means interconnecting said rotor and stator to maintain a small axial clearance between said blades of said rotor and the adjacent portion of said stator; a turbine assembly including a bladed rotor, a stator and means interconnecting said turbine rotor and stator to maintain a small axial clearance between the blades of said turbine rotor and the adjacent portion of the turbine stator; shaft means drivably connecting the rotors of said turbine and compressor assemblies; an axially rigid housing within which said turbine and compressor assemblies and said shaft means are disposed; means supporting said compressor assembly from said housing; and means supporting said turbine assembly from said housing, said turbine assembly supporting means including a plurality of annular plates stacked together and connected along one of their edges to said housing and along their other edges to said turbine assembly to connect the turbine and compressor stators together through said housing and said annular plates so as to provide for relative axial movement between said stators, whereby said shaft means and rotors can expand relative to said housing without changing the axial positions of said rotors relative to their respective stators.

7. A gas turbine power plant comprising a compressor assembly including a bladed rotor, a stator and means interconnecting said rotor and stator to maintain a small axial clearance between the blades of said rotor and the adjacent portion of said stator; a turbine assembly including a bladed rotor, a stator and means interconnecting said turbine rotor and stator to maintain a small axial clearance between the blades of said turbine rotor and the adjacent portion of the turbine stator; a shaft drivably connecting the rotors of said turbine and compressor assemblies to provide an axially rigid rotor structure; a housing within which the turbine and compressor assemblies and shaft are disposed; means supporting said compressor assembly from one portion of said housing; means supporting said turbine assembly from another portion of said housing, said housing being axially rigid between its said portions, one of said supporting means including axially flexible but radially rigid means connecting the turbine and compressor assemblies together through said housing and through said axially flexible means to provide for relative axial movement between said stators, whereby said shaft and rotors can expand relative to said housing without changing the axial positions of said rotors relative to their respective stators.

WILTON G. LUNDQUIST.

REFERENCES CITED

The following references are of record in the file of this patent:

UNITED STATES PATENTS

| Number | Name | Date |
|---|---|---|
| 1,491,423 | Rice | Apr. 22, 1924 |
| 1,985,964 | Warren | Jan. 1, 1935 |